(12) United States Patent
Walker et al.

(10) Patent No.: US 10,675,687 B2
(45) Date of Patent: Jun. 9, 2020

(54) METHOD OF PRODUCING INSULATING THREE-DIMENSIONAL (3D) STRUCTURES USING 3D PRINTING

(71) Applicant: GM GLOBAL TECHNOLOGY OPERATIONS LLC, Detroit, MI (US)

(72) Inventors: Michael J. Walker, Shelby Township, MI (US); Jason R. Traub, Clinton Township, MI (US); Peter P. Andruskiewicz, IV, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 400 days.

(21) Appl. No.: 15/465,683

(22) Filed: Mar. 22, 2017

(65) Prior Publication Data
US 2017/0274456 A1    Sep. 28, 2017

Related U.S. Application Data

(60) Provisional application No. 62/312,877, filed on Mar. 24, 2016.

(51) Int. Cl.
*B33Y 10/00*    (2015.01)
*B23K 26/342*    (2014.01)
(Continued)

(52) U.S. Cl.
CPC .......... *B22F 5/008* (2013.01); *B22F 1/0014* (2013.01); *B22F 1/0051* (2013.01); *B22F 1/025* (2013.01);
(Continued)

(58) Field of Classification Search
CPC ........ C22C 1/0433; B22F 1/0051; B22F 1/02; B22F 3/1112; B22F 1/025; B22F 5/008;
(Continued)

(56) References Cited

U.S. PATENT DOCUMENTS

2,373,116 A * 4/1945 Hobrock ................. B21C 37/09
                                                           219/85.15
5,382,308 A    1/1995 Bourell et al.
(Continued)

FOREIGN PATENT DOCUMENTS

CN    101748402 A    6/2010
CN    104451519 A    3/2015
(Continued)

*Primary Examiner* — Jessee R Roe
*Assistant Examiner* — Rebecca Janssen
(74) *Attorney, Agent, or Firm* — Quinn IP Law

(57) ABSTRACT

A method of manufacturing a highly insulating three-dimensional (3D) structure is provided. The method includes depositing a first layer of hollow microspheres onto a base. The hollow microspheres have a metallic coating formed thereon. A laser beam is scanned over the hollow microspheres so as to sinter the metallic coating of the hollow microspheres at predetermined locations. At least one layer of the hollow microspheres is deposited onto the first layer. Scanning by the laser beam is repeated for each successive layer until a predetermined 3D structure is constructed. The 3D structure includes a composite thermal barrier coating (TBC), which may be applied to a surface of components within an internal combustion engine, and the like. The composite TBC is bonded to the components of the engine to provide low thermal conductivity and low heat capacity insulation that is sealed against combustion gasses.

19 Claims, 5 Drawing Sheets

(51) Int. Cl.
*B22F 1/02* (2006.01)
*B22F 3/105* (2006.01)
*B22F 7/00* (2006.01)
*B22F 5/00* (2006.01)
*C04B 30/00* (2006.01)
*B33Y 50/02* (2015.01)
*B33Y 70/00* (2020.01)
*B33Y 80/00* (2015.01)
*B22F 1/00* (2006.01)
*B22F 3/24* (2006.01)
*B23K 26/00* (2014.01)
*F02F 1/18* (2006.01)
*B23K 101/04* (2006.01)
*B23K 101/34* (2006.01)
*B23K 103/16* (2006.01)
*C04B 111/00* (2006.01)

(52) U.S. Cl.
CPC .............. *B22F 3/1055* (2013.01); *B22F 3/24* (2013.01); *B22F 7/008* (2013.01); *B23K 26/0006* (2013.01); *B23K 26/342* (2015.10); *B33Y 10/00* (2014.12); *B33Y 50/02* (2014.12); *B33Y 70/00* (2014.12); *B33Y 80/00* (2014.12); *C04B 30/00* (2013.01); *F02F 1/18* (2013.01); *B22F 2003/248* (2013.01); *B22F 2301/10* (2013.01); *B22F 2301/15* (2013.01); *B22F 2302/45* (2013.01); *B22F 2304/10* (2013.01); *B22F 2998/10* (2013.01); *B22F 2999/00* (2013.01); *B23K 2101/04* (2018.08); *B23K 2101/34* (2018.08); *B23K 2103/16* (2018.08); *C04B 2111/00181* (2013.01); *C04B 2111/00612* (2013.01); *F02F 2200/00* (2013.01); *Y02P 10/295* (2015.11)

(58) Field of Classification Search
CPC .......... B22F 3/1055; B22F 3/24; B22F 7/008; B22F 1/0014; B22F 2999/00; B22F 2003/248; B22F 2998/10; B22F 2304/10; B22F 2302/45; B22F 2301/15; B22F 2301/10; C23C 10/00; C04B 30/00; C04B 2111/00181; C04B 2111/00612; B23K 26/0006; B23K 26/342; B23K 2103/16; B23K 2101/04; B23K 2101/34; F02F 1/18; F02F 2200/00; B33Y 70/00; B33Y 80/00; B33Y 10/00; B33Y 50/02; Y02P 10/295
USPC ........................................................ 419/29
See application file for complete search history.

(56) References Cited

U.S. PATENT DOCUMENTS

| | | | |
|---|---|---|---|
| 9,738,788 B1* | 8/2017 | Gross | C09D 1/00 |
| 2006/0093801 A1* | 5/2006 | Darolia | C23C 4/18 |
| | | | 428/215 |
| 2014/0099476 A1* | 4/2014 | Subramanian | B22F 5/009 |
| | | | 428/164 |
| 2017/0184108 A1* | 6/2017 | Scancarello | F04C 29/04 |

FOREIGN PATENT DOCUMENTS

| | | | | |
|---|---|---|---|---|
| CN | 104451672 A | 3/2015 | | |
| CN | 104684667 A | 6/2015 | | |
| JP | 2007286315 A | 11/2007 | | |
| WO | WO-2015042491 A1 * | 3/2015 | ............. | C23C 26/00 |
| WO | WO-2016147282 A1 * | 9/2016 | ............. | F01D 5/28 |

* cited by examiner

METHOD OF PRODUCING INSULATING THREE-DIMENSIONAL (3D) STRUCTURES USING 3D PRINTING

CROSS REFERENCE TO RELATED APPLICATIONS

This application claims the benefit of and priority to U.S. Provisional Patent Application No. 62/312,877, filed on Mar. 24, 2016, which is hereby incorporated by reference in its entirety.

TECHNICAL FIELD

The present disclosure is related to a method of producing insulating three-dimensional (3D) structures using 3D printing.

BACKGROUND

Internal combustion engines include a plurality of cylinders, a plurality of pistons, at least one intake port, and at least one exhaust port. The cylinders each include surfaces that define a combustion chamber. One or more surfaces of the internal combustion engine are coated with thermal barrier coatings to improve the heat transfer characteristics of the internal combustion engine.

SUMMARY

A method of manufacturing a highly insulating three-dimensional (3D) structure is provided. The method includes depositing a first layer of hollow microspheres onto a base. The hollow microspheres have a metallic coating formed thereon. A laser beam is scanned over the hollow microspheres so as to sinter the metallic coating of the hollow microspheres at predetermined locations. At least one layer of the hollow microspheres are deposited onto the first layer. Scanning by the laser beam is repeated for each successive layer until a predetermined 3D structure is constructed.

The 3D structure includes a composite thermal barrier coating (TBC), which may be applied to a surface of components within an internal combustion engine, and the like. The composite TBC is bonded to the components of the engine to provide low thermal conductivity and low heat capacity insulation that is sealed against combustion gasses.

The composite TBC includes three layers, bonded to one another, i.e., a first (bonding) layer, a second (insulating) layer, and a third (sealing) layer. The insulating layer is disposed between the bonding layer and the sealing layer. The bonding layer is bonded to the component and to the insulating layer.

The insulating layer comprises hollow microspheres that are sintered together to form insulation that provides a low effective thermal conductivity and low effective heat capacity.

The sealing layer is a thin film that is configured to resist the high temperatures, present within the engine. The sealing layer is impermeable to gasses and presents a smooth surface.

The composite TBC has a low thermal conductivity to reduce heat transfer losses and a low heat capacity so that the surface temperature of the composite TBC tracks the gas temperature in the combustion chamber. Thus, the composite TBC allows surface temperatures of the component to swing with the gas temperatures. This reduces heat transfer losses without affecting the engine's breathing capability and without causing knock. Further, heating of cool air entering the cylinder of the engine is reduced. Additionally, exhaust temperature is increased, resulting in faster catalyst light off time and improved catalyst activity.

The above features and advantages and other features and advantages of the present teachings are readily apparent from the following detailed description of the best modes for carrying out the present teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims.

Figure 1:
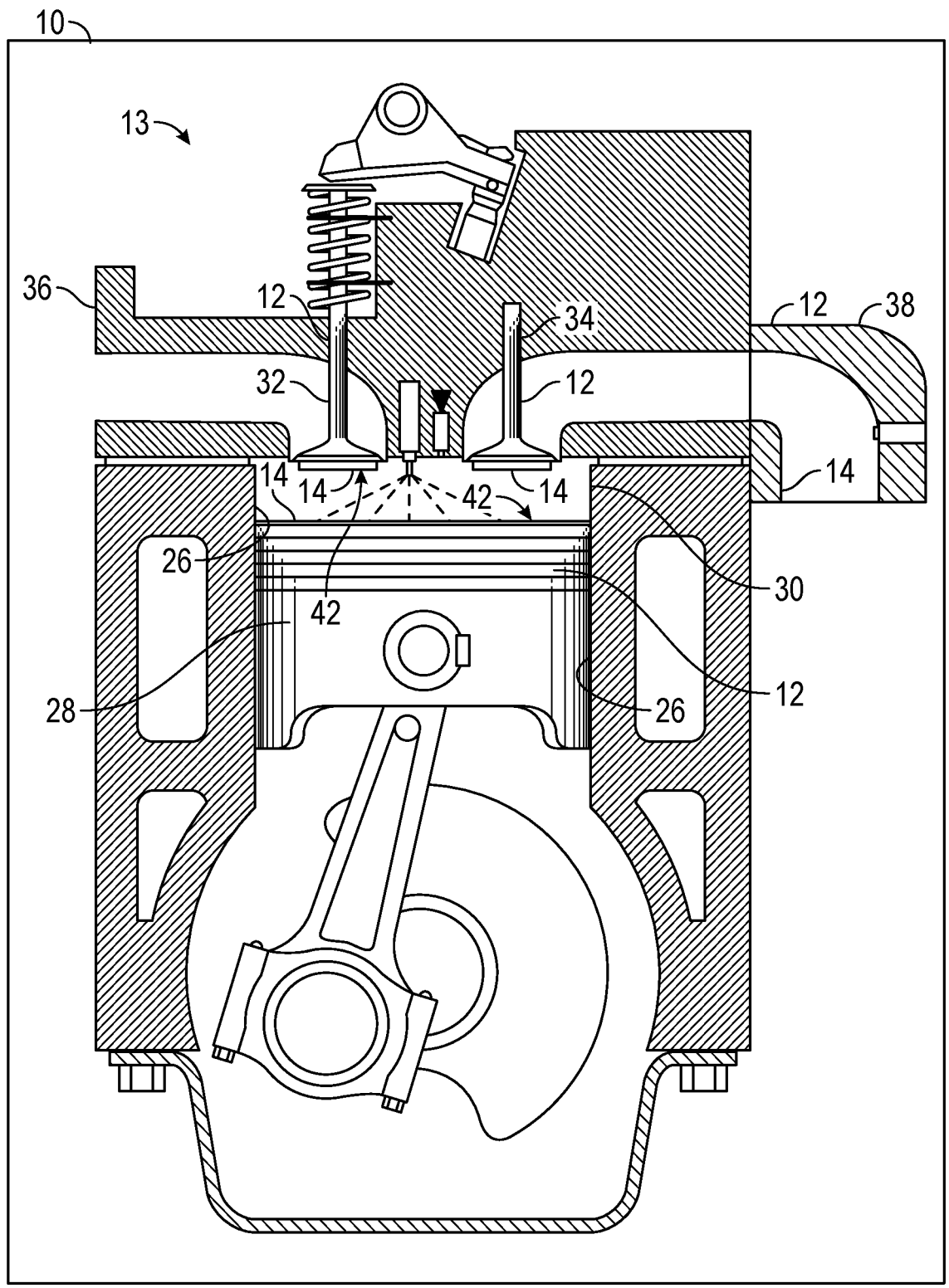
FIG. 1 is a schematic, diagrammatic view of a vehicle illustrating a side view of a single cylinder internal combustion engine having a composite thermal barrier coating disposed on a plurality of components.

Referring to the drawings, wherein like reference numbers refer to like components throughout the views, FIG. 1 shows a portion of an example vehicle 10. The vehicle 10 may include an engine 13 having a component 12. The component 12 has a composite (multi-layer) thermal barrier coating (TBC) 14 formed as an insulating three-dimensional (3D) structure 15, of the type disclosed herein, applied thereto. A method of producing the 3D structures 15 using an additive manufacturing system 50 will be described in more detail below, as shown at 100 in FIG. 8.

Referring again to FIG. 1, while the vehicle 10 and the engine 13 of FIG. 1 are a typical example application, suitable for the composite TBC 14 disclosed herein, the present design is not limited to vehicular and/or engine applications. Any stationary or mobile, machine or manufacture, in which a component thereof is exposed to heat may benefit from use of the present design. For illustrative consistency, the vehicle 10 and engine 13 will be described hereinafter as an example system, without limiting use of the composite TBC 14 to such an embodiment.

FIG. 1 illustrates an engine 13 defining a single cylinder 26. However, those skilled in the art will recognize that the present disclosure may also be applied to components 12 of engines 13 having multiple cylinders 26. Each cylinder 26 defines a combustion chamber 30. The engine 13 is configured to provide energy for propulsion of the vehicle 10. The engine 13 may include but is not limited to a diesel engine or a gasoline engine.

The engine 13 further includes an intake assembly 36 and an exhaust manifold 38, each in fluid communication with the combustion chamber 30. The engine 13 includes a reciprocating piston 28, slidably movable within the cylinder 26.

The combustion chamber 30 is configured for combusting an air/fuel mixture to provide energy for propulsion of the vehicle 10. Air may enter the combustion chamber 30 of the engine 13 by passing through the intake assembly 36, where airflow from the intake manifold into the combustion chamber 30 is controlled by at least one intake valve 32. Fuel is injected into the combustion chamber 30 to mix with the air, or is inducted through the intake valve(s) 32, which provides an air/fuel mixture. The air/fuel mixture is ignited within the combustion chamber 30. Combustion of the air/fuel mixture creates exhaust gas, which exits the combustion chamber 30 and is drawn into the exhaust manifold 38. More specifically, airflow (exhaust flow) out of the combustion chamber 30 is controlled by at least one exhaust valve 34.

Figure 2:
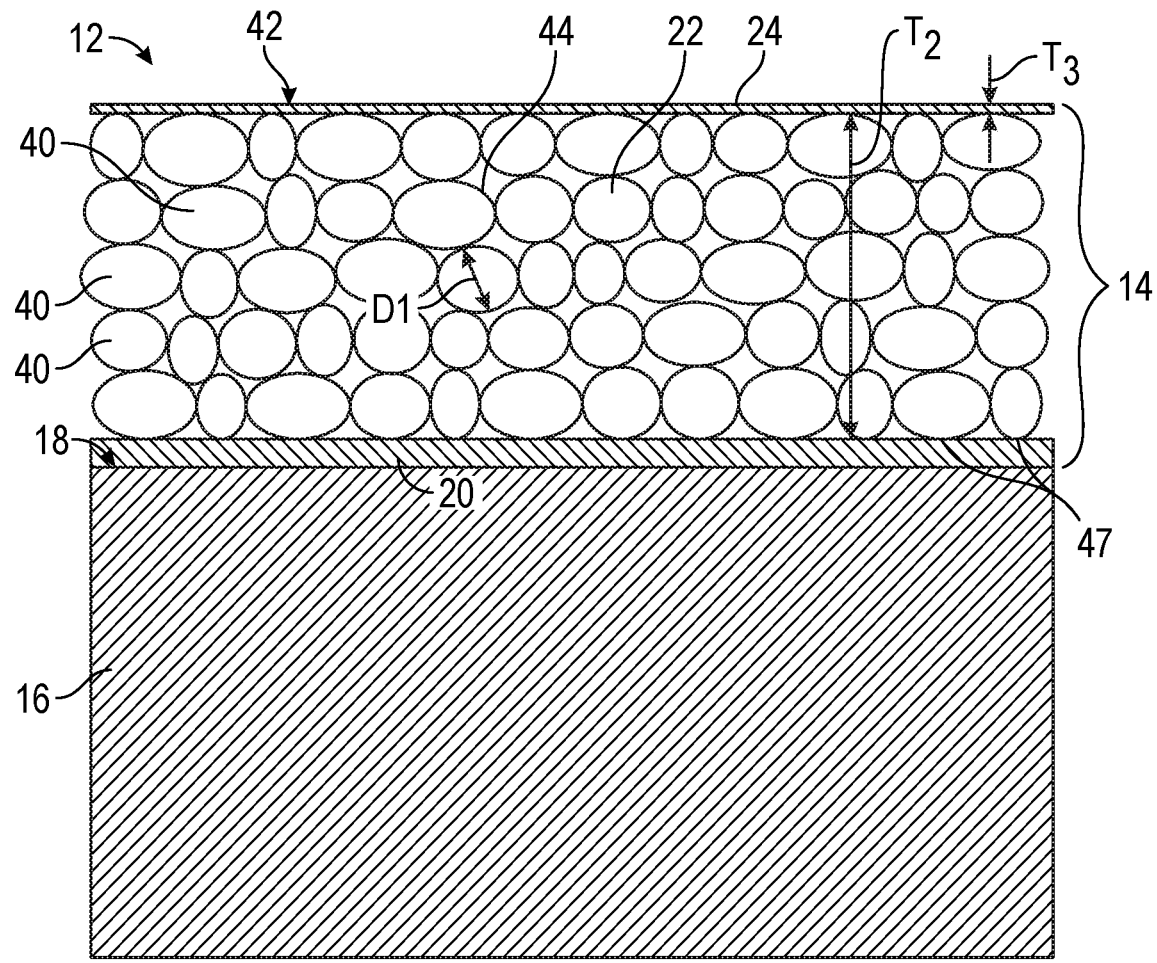
FIG. 2 is a schematic cross-sectional side view of the composite thermal barrier coating disposed on the component.

With reference to FIGS. 1 and 2, the composite TBC 14 may be disposed on a face or surface of one or more of the components 12 of the engine 13, i.e., the piston 28, the intake valve 32, exhaust valve 34, interior walls of the exhaust manifold 38, top of the combustion chamber 30, and the like. The composite TBC 14 is bonded to the component 12 to form an insulator configured to reduce heat transfer losses, increase efficiency, and increase exhaust gas temperature during operation of the engine 13. The composite TBC 14 is configured to provide low thermal conductivity and low heat capacity. As such, the low thermal conductivity reduces heat transfer losses and the low heat capacity means that the surface of the composite TBC 14 tracks with the temperature of the gas during temperature swings and heating of cool air entering the cylinder is minimized.

Referring to FIG. 2, each component 12 includes a substrate 16 presenting a surface 18, and the composite TBC 14 is bonded to the surface 18 of the substrate 16. The composite TBC 14 may include three layers, i.e., a first (bonding) layer 20, a second (insulating) layer 22, and a third (sealing) layer 24. However, depending on the material provided, it should be appreciated that in some embodiments, the TBC 14 may not include the first bonding layer 20, because an outer portion of the insulating layer 22 may be configured to bond directly to the substrate 16. For example, when the first bonding layer 20 includes nickel (Ni) and the substrate 16 includes iron (Fe), the first layer 20 may not be required. However, as explained in more detail below, the composite TBC 14 may include more than three layers.

The insulating layer 22 includes a plurality of hollow microspheres 40, sintered together to create a layer having an extremely high porosity. Preferably, the porosity of the insulating layer 22 is at least 80%. More preferably, the porosity of the insulating layer 22 is at least 95%. The high porosity provides for a corresponding volume of air and/or gases to be contained therein, thus providing the desired insulating properties of low effective thermal conductivity and low effective heat capacity. The thickness T2 of the insulating layer is between 100 microns (μm) and 1 millimeter (mm). More preferably, the thickness T2 of the insulating later 22 is between 100 and 500 μm. Even more preferably, the thickness T2 of the insulating layer is between 100 and 300 μm. The insulating layer 22 is configured to withstand pressures of at least 150 bar and withstand surface temperatures of at least 1,100 degrees Celsius (° C.). The heat capacity of the TBC 14 may be configured to ensure the surface of the substrate 16 does not get above 500° C.

The hollow microspheres 40 may be comprised of hollow polymer, metal, glass, and/or ceramic spheres 45. In one non-limiting embodiment, the hollow microspheres 40 are comprised of metal, such as nickel, nickel alloy compounds, and the like. At least one metallic coating layer 44 may be disposed on an exterior surface of each sphere 45. The metallic coating layer 44 may include nickel (Ni). The metallic coating layer 44 may be disposed on the exterior surface of the microspheres 40 via electroplating, flame spraying, painting, electroless plating, vapor deposition, and the like. It should be appreciated that during the bonding or sintering of the metallic coated microspheres, the hollow spheres 45 that are comprised of polymer, metal, and glass having a melting temperature that is less than that of the metallic coating layer 44, the hollow microspheres 45 may melt or otherwise disintegrate to become part of the metallic coating layer 44 itself, or melt and turn into a lump of material within the hollow microsphere 40. However, when the melting temperature of the hollow sphere 45 is higher than the melting temperature of the material of the metallic coating layer 44, such as when the hollow sphere 45 is formed from a ceramic material, the hollow sphere 45 remains intact and does not disintegrate or become absorbed. The metallic coating layer 44 may include nickel, iron, and the like. The hollow microspheres 40 may have a diameter D1 of between 5 and 100 μm. More preferably, the microspheres 40 may have a diameter D1 of between 20 and 100 μm. Even more preferably, the microspheres 40 may have a diameter D1 of between 20-40 μm. It should be appreciated that the microspheres do not necessarily have the same diameter, as a mixture of diameters may be configured to provide a desired open porosity, i.e., packing density, to provide a desired amount of strength to the insulating layer. A plurality of the hollow microspheres 40 may be molded or sintered at a sintering temperature, under pressure, for a molding time, until bonds are formed between the coating layers 44 of adjacent hollow microspheres 40 to form the insulating layer 22. The sintering temperature may approach the melting temperature of the coating layer 44. However, in the case where the hollow spheres 45 are comprised of ceramic material, the sintering temperature will not be below the melting temperature of the metal coated spheres 45.

Figure 4:
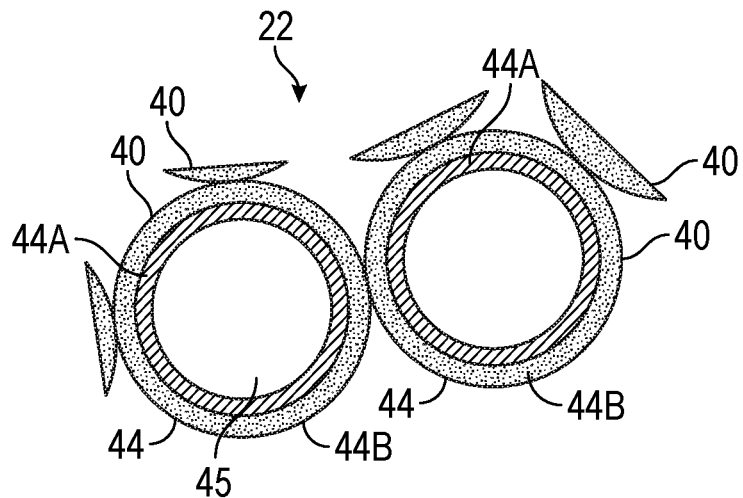
FIG. 4 is a schematic cross-sectional side view of a section of hollow microspheres, each having a first and second metallic coating layer.
Figure 5:
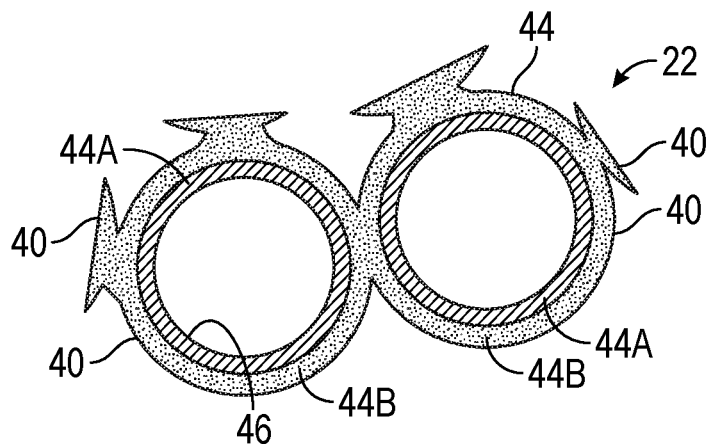
FIG. 5 is a schematic cross-sectional side view of the section of hollow microspheres of FIG. 4, with the second metallic coating layers sintered together.
Figure 6:
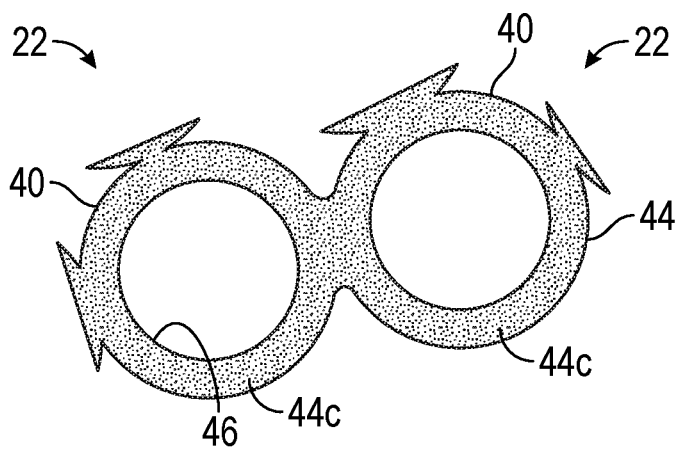
FIG. 6 is a schematic cross-sectional side view of the section of hollow microspheres of FIG. 5, with the first and second metallic coating layers diffusion bonded together for form a metallic alloy.

In another embodiment, shown in FIGS. 4-6, the insulating layer 22 may be formed from hollow microspheres 40 that initially include two metallic coating layers 44A, 44B. Referring first to FIG. 4, the hollow microspheres 40 initially include a first (inner) metallic coating layer 44A, coated by a second (outer) metallic coating layer 44B. The inner metallic coating layer 44A comprises nickel (Ni), Iron (Fe), and alloys of nickel and iron, which is then coated with the outer metallic coating layer 44B that comprises copper (Cu or Cu—Zn). In one non-limiting example, a suitable alloy is commercially available under the trade name Hastalloy from Haynes International, Inc. of Kokomo, Ind. The outer metallic coating 44B of Cu or Cu—Zn is applied to the inner metallic coating layer 44A via electroplating, flame spraying, painting, electroless plating, vapor deposition, and the like, to form the outer metallic coating layer 44B. A thickness of the outer metallic coating layer 44B should be thinner than a thickness of the inner metallic coating layer 44A. Further, a weight of the metallic (i.e., Cu or Cu—Zn) material of the outer metallic coating layer 44B may not be much greater than a weight of the metallic (i.e., Ni) of the inner metallic coating layer 44A. As such, the weight of the Cu material of the outer metallic coating layer 44B should be 10-20% of the weight of the Ni of the outer metallic coating layer 44B. It is important to maintain a low quantity of Cu, since too much Cu will lower the melting temperature of the resultant alloy material.

Figure 3:
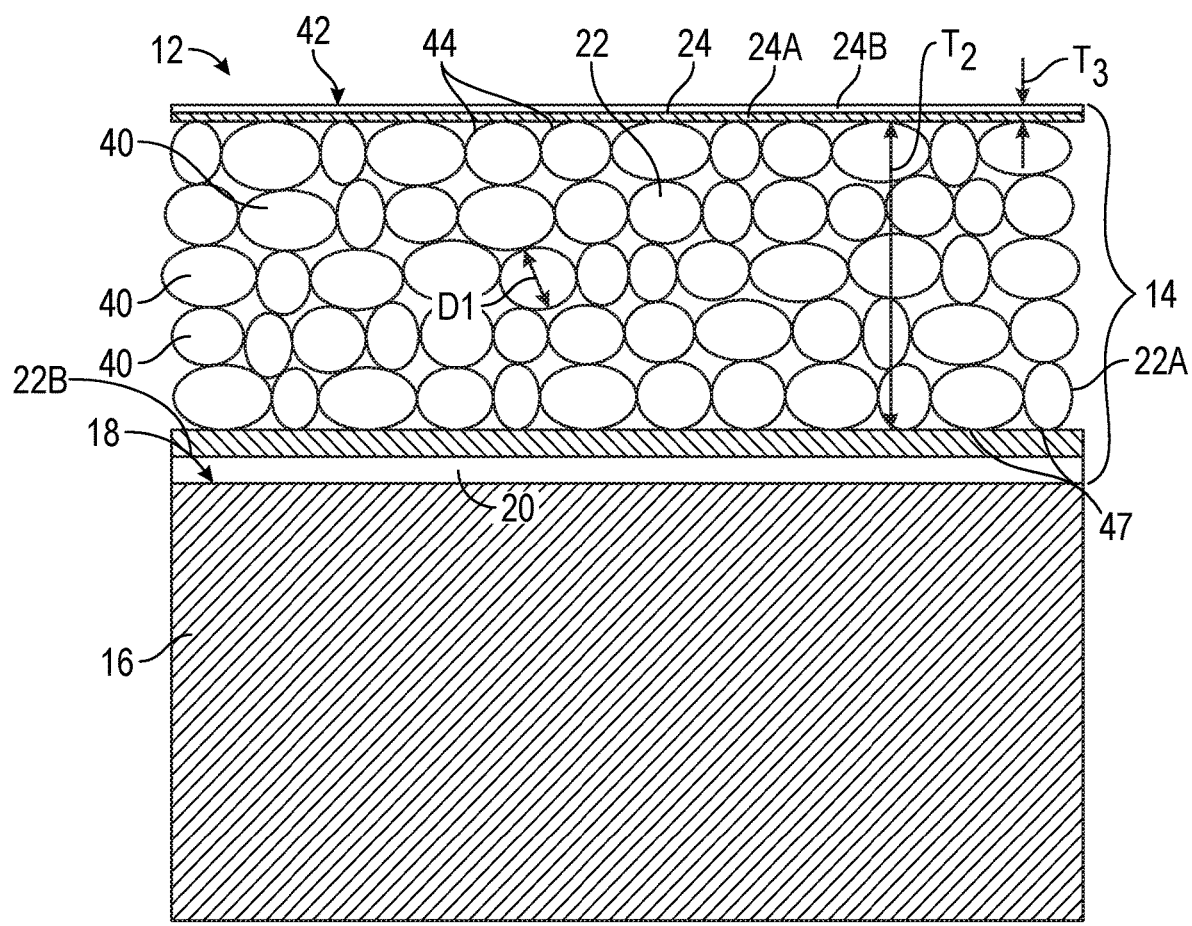
FIG. 3 is a schematic cross-sectional side view of another embodiment of the composite thermal barrier coating disposed on the component.

With reference to FIGS. 2 and 3, the coated microspheres 40 are arranged in a desired layer, having a desired thickness T2. Referring to FIG. 5, the microspheres 40 are heated to a temperature approximately equal to or above a melting temperature of the outer metallic coating layer 44B. As such, the temperature is sufficient to cause melting of the second coating layer 44B. Next, referring to FIG. 6, the temperature is decreased to below the solidus. The temperature is maintained below the solidus for a period of time, but at a sufficient temperature, such that diffusion occurs between the copper (Cu or Cu—Zn) of the second coating layer 44B and the nickel (Ni), iron (Fe), and alloys of nickel and iron of the inner metallic coating layer 44A. As such, solid state diffusion occurs between the respective inner and outer metallic coating layers 44A, 44B to form an alloy metallic coating layer 44C. Thus, the resultant insulating layer 22 includes a nickel-copper (Ni—Cu) alloy layer 44C surrounding the hollow microspheres 40. The amount of diffusion that occurs between the inner and outer metallic coating layers 44A, 44B is a function of the temperature and time applied to the microspheres 40. Additionally, the diffusion bonding may be done at increased pressure in order to equalize a pressure within each of the microspheres 40 and atmosphere.

Additionally, when the hollow microspheres 40 are formed from ceramic, and are heated to promote bonding between the adjacent microspheres 40, the spheres 45, upon which the inner metallic coating layer 44A is deposited, may melt. In instances where the hollow spheres 45 are formed from polymer, metal, and glass, the hollow spheres 45 may melt as a function of the material properties of the hollow sphere 45, and a sintering temperature applied to the microspheres 40. Therefore, when melting of the inner metallic coating layer 44A occurs, the inner metallic coating 44 is absorbed or otherwise disappears, and is no longer a "coating", but rather becomes an inner wall 46 of the microsphere 40.

With reference to FIG. 2, the bonding layer 20 is configured to bond to the surface 18 of the substrate 16 and to the insulating layer 22, such that the insulating layer 22 is attached to the substrate 16. In one non-limiting embodiment, the bonding layer 20 is configured to diffuse into the surface 18 of the substrate 16 and into the insulating layer 22 to form bonds therebetween. In one non-limiting embodiment, the substrate 16 comprises aluminum, the insulating layer 22 comprises nickel coated microspheres 40, and the bonding layer 20 comprises brass, i.e., a copper-zinc (Cu—Zn) alloy material. The Cu—Zn content is determined to create optimum bonding strength, optimum thermal expansion characteristics, heat treatment processes, fatigue resistance, and the like. The copper and zinc have good solid solubility in aluminum, nickel, and iron, while iron and nickel have very low solid solubility in aluminum. Thus, a bonding layer 20 having copper and zinc combinations provides an intermediate structural layer that promotes diffusion bonding between the adjacent aluminum substrate 16 and the adjacent nickel or iron insulating layer 22. It should be appreciated, however, that the substrate 16, insulating layer 22, and bonding layer 20 are not limited to aluminum, nickel, and brass, but may comprise other materials.

One side of the bonding layer 20 may be disposed across the surface 18 of the substrate 16, such that the bonding layer 20 is disposed between the substrate 16 and the insulating layer 22. A compressive force may be applied to the insulating layer 22 and the substrate 16, at a bonding temperature, for at least a minimum apply time. The melting temperature of the material of the bonding layer 20 is less than the melting temperature of each of the substrate 16 and the material of the insulating layer 22. In another embodiment, the melting temperature of the material of the bonding layer 20 is between the melting temperature of each of the substrate 16 and the material of the insulating layer 22. Further, the required bonding temperature may be less than the melting temperature of the material of the substrate 16 and the material of the insulating layer 22, but sufficiently high enough to encourage diffusion bonding to occur between the metallic material of the substrate 16 and the metallic material of the bonding layer 20 and between the metallic material of the substrate 16 and the metallic material of the insulating layer 22.

With reference to FIG. 2, it should be appreciated that the bonding layer 20 may be bonded to an inner surface of the insulating layer 22 prior to bonding the bonding layer 20 to the surface 18 of the substrate 16.

Additionally, the bonding layer 20 is not limited to being bonded to the surface 18 of the substrate 16 and/or the insulating layer 22 with solid-state diffusion, as other methods of adhesion may also be used, such as by wetting, brazing, and combinations thereof.

Referring now to FIG. 3, the insulating layer 22 may include more than one layer. More specifically, the insulating layer 22 may include a microstructure layer 22A and a transition layer 22B. The microstructure layer 22A is a layer comprising the plurality of hollow microspheres 40, bonded together, as described above. The transition layer 22B may be comprised of nickel or iron. More specifically, the metallic material of the transition layer 22B and the coating for the microspheres 40 of the microstructure layer 22A are identical to promote bonding between the layers 22A, 22B. As such, the microspheres 40 on a periphery of the microstructure layer 22A are bonded to the transition layer 22B when the microstructure layer 22A and the transition layer 22B are heated to a temperature sufficient to sinter the microsphere layer (i.e., the insulating layer 22) to the transition layer 22B of the metallic material (i.e., nickel, iron, and the like). The microstructure layer 22A is formed to have a thickness T2 of between 100 μm and 1 mm. More preferably, the thickness T2 of the microstructure layer 22A is between 100 and 500 μm. Even more preferably, the thickness T2 of the microstructure layer 22A is between 100 and 300 μm. The microstructure layer 22A is configured to withstand pressures of at least 150 bar and withstand surface temperatures of at least 1,100° C.

The transition layer 22B bonds to the coating 44 of the individual microspheres 40 at points of contact 47. The transition layer 22B provides a supporting structure or backbone for the microsphere layer 22A, thus giving the insulating layer 22 strength and rigidity. As such, the strength and rigidity of the insulating layer 22 is a function of a thickness of the transition layer. Additionally, the transition layer 22B is bonded to the bonding layer 20, opposite the microstructure layer 22A, such that the bonding layer 20 is disposed between the substrate 16 and the transition layer 22B of the insulating layer 22. As such, the transition layer 22B is disposed in facing contact relationship with the bonding layer 20. Upon the application of heat to the transition layer and the bonding layer, for a sufficient amount of time, metal diffusion occurs between the bonding layer 20 and the substrate 16 and between the bonding layer 20 and the transition layer 22B of the insulating layer 22. The transition layer 22B provides greater surface area contact to the bonding layer 20 for promoting a larger area of diffusion bonding, than when the transition layer 22B is not used, and the microspheres 40 of the microstructure layer 22A diffusion bond directly to the bonding layer 20 (as shown in FIG. 2).

It should be appreciated that a desired number of bonding layers 20 may be applied, provided the desired characteristics, so long as the bonding layer 20 bonds to the insulating layer 22 and to the substrate 16.

Referring again to FIG. 2, the sealing layer 24 is disposed over the insulating layer 22, such that the insulating layer 22 is disposed between the sealing layer 24 and the bonding layer 20. The sealing layer 24 is a high temperature, thin film. More specifically, the sealing layer 24 comprises material that is configured to withstand temperatures of at least 1,100° C. The sealing layer 24 is configured to be thin, i.e., a thickness T3 not greater than 20 μm. More preferably, the sealing layer 24 is configured to have a thickness T3 of not greater than 5 μm. The sealing layer 24 is non-permeable to combustion gases, such that a seal is provided between the sealing layer 24 and the insulating layer 22. Such a seal prevents debris from combustion gases, such as unburned hydrocarbons, soot, partially reacted fuel, liquid fuel, and the like, from entering the porous structure defined by the hollow microspheres 40. If such debris were allowed to enter the porous structure, air disposed in the porous structure would end up being displaced by the debris, and the insulating properties of the insulating layer 22 would be reduced or eliminated.

The sealing layer 24 may be configured to present an outer surface 42 that is smooth. Having a smooth sealing layer 24 may be important to prevent the creation of turbulent airflow as the air flows across the outer surface 42 of the sealing layer 24. Further, having a sealing layer 24 with a smooth surface will prevent an increased heat transfer coefficient. In one non-limiting example, the sealing layer 24 may be applied to the insulating layer 22 via electroplating or vapor deposition. In another non-limiting example, the sealing layer 24 may be applied to the insulating layer simultaneously with sintering the insulating layer 22.

The sealing layer 24 is configured to be sufficiently resilient so as to resist fracturing or cracking during exposure to combustion gases, thermal fatigue, or debris. Further, the sealing layer 24 is configured to be sufficiently resilient so as to withstand expansion and/or contraction of the underlying insulating layer 22.

Referring again to FIG. 3, the sealing layer 24 may include more than one layer. More specifically, the sealing layer 24 may include a first barrier layer 24A and a second barrier layer 24B. The first barrier layer 24A may be disposed on the insulating layer 22, and the second barrier layer 22B may be disposed on the first barrier layer 24A, such that the first barrier layer 24A is disposed between the second barrier layer 24B and the insulating layer 22. The second barrier layer 24B may be configured to present the outer surface 42 that is smooth. The first barrier layer 24A and the second barrier layer 24B may be layered upon one another to provide desired properties, e.g., super-high temperature resistance, corrosion resistance. In one non-limiting example, the second barrier layer 24B provides corrosion resistance and super-high temperature resistance, while the first barrier layer 24A provides a seal against the underlying insulating layer 22 to prevent debris from entering open spaces defined between microspheres 40 of the underlying insulating layer 22. It should be appreciated that a desired number of sealing layers 24 may be applied, provided the desired characteristics, so long as the sealing layer 24 seals against the underlying insulating layer 22 to prevent debris or gases from entering the open spaces defined between the microspheres 40. Additionally, a thickness T3 of the sealing layer 24, regardless of the number of component barrier layers, is preferably not greater than 20 μm. More preferably, the thickness T3 of the sealing layer 24 is configured to have a thickness T3 of not greater than 5 μm.

Further, the bonding, insulating, and sealing layers 20, 22, 24 are each configured to have compatible coefficient of thermal expansion characteristics to withstand thermal fatigue.

It should be appreciated that the composite TBC 14 may be applied to components other than present within an internal combustion engine. More specifically, the composite TBC 14 may be applied to components of spacecraft, rockets, injection molds, and the like.

Figure 7:
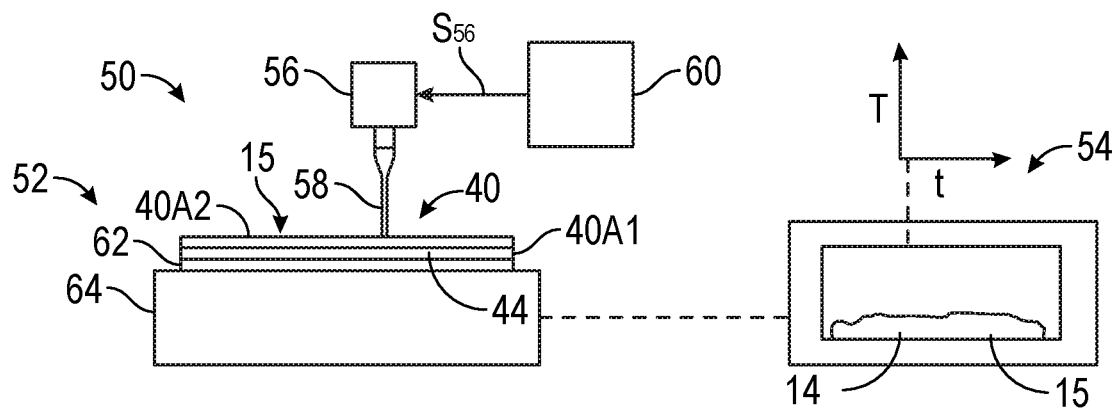
FIG. 7 is a schematic diagrammatic view of an additive manufacturing system including an additive manufacturing device and an oven for forming a three-dimensional (3D) structure including the composite thermal barrier coating.

Referring now to FIG. 7, the additive manufacturing system 50 is shown. The additive manufacturing system 50 includes an additive manufacturing device 52 and an oven 54. The oven 54 may be optional, depending on the metallic materials of the coatings 44 and of the layers 20, 22, 24 (shown in FIGS. 2 and 3). Referring again to FIG. 7, the additive manufacturing device 52 is configured to form the 3D insulating structure 15 by an additive manufacturing process, where a laser device 56 directs a laser beam 58 onto predetermined locations of a layer of deposited hollow microspheres 40. The laser beam 58 fuses the coatings 44 of the adjacent microspheres 40 together to provide a highly insulating, low heat capacity 3D structure 15. In some instances, additional heat treatment of the 3D insulating structure may be required. As such, the 3D insulating structure 15 may be placed into a preheated oven 54, for a required period of time (t), until the desired sintering occurs, such that sufficient diffusion of the metallic materials between the layers is achieved.

Figure 8:
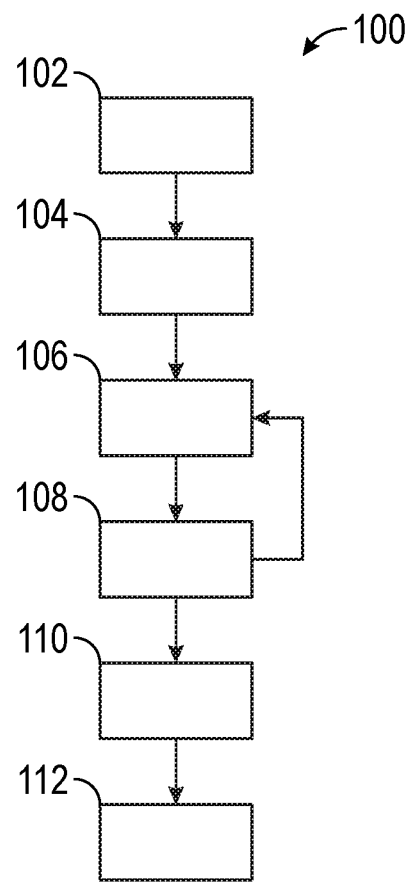
FIG. 8 is a flow chart describing an example method for forming a three-dimensional (3D) structure including the composite thermal barrier coating.

Referring to FIG. 8, and with continued reference to FIG. 7, the method of forming the 3D insulating structure 15 is shown. The method 100 uses an additive manufacturing process, such as direct metal laser sintering (DMLS), selective laser sintering (SLS), and selective laser melting (SLM), and the like.

"Additive manufacturing" may sometimes be referred to as "3D printing". Additive manufacturing is a manufacturing process for making the 3D insulating structure 15 having a desired shape from a digital model. The 3D shape is achieved using an additive process, where successive layers of hollow microspheres 40 are laid down in different shapes. The hollow microspheres 40 may be applied by the additive manufacturing device 52 in a desired way. A materials printer usually performs 3D printing processes using digital technology in order to produce complex shaped components of high insulating capability, The 3D printing technology may be used for both prototyping and distributed manufacturing with applications in architecture, construction (AEC), industrial design, automotive, aerospace, military, engineering, civil engineering, dental and medical industries, biotech (human tissue replacement), fashion, footwear, jewelry, eyewear, education, geographic information systems, food, and many other fields.

SLM is an additive manufacturing process that uses 3D CAD data as a digital information source and energy in the form of a high-power laser beam 58, for example an ytterbium fiber laser to create three-dimensional metallic parts by fusing the metallic coatings 40 together.

Selective laser sintering (SLS) is another additive manufacturing technique that uses a laser 48 as the power source to sinter powdered material such as, for example, metal powders, aiming the laser automatically at points in space defined by a 3D model, binding the material together to create a solid structure. The process is similar to direct metal laser sintering (DMLS); the two are instantiations of the same concept but differ in technical details. SLM uses a comparable concept, but in SLM the material is fully melted rather than sintered. SLS permits different properties such as crystal structure, porosity, and so on to be useful in the final part. SLS is a relatively new technology that so far has mainly been used for rapid prototyping and for low-volume production of component parts. In an embodiment the composite material comprising ceramic, glass, mineral or metal particles can be formed into a filament and delivered by Fused Selective Laser Sintering (SLS).

Direct metal laser sintering (DMLS) is yet another additive manufacturing technique that uses a laser 56 as the power source to direct a laser beam 58 to sinter powdered material (typically metal), aiming the laser beam 58 automatically at points in space defined by a 3D model, thus binding the coating material 44 together to eventually create a 3D insulating structure 15. The DMLS process is similar to SLS. SLM uses a comparable concept, but in SLM the material is fully melted rather than sintered, allowing different properties (crystal structure, porosity, and so on). The DMLS process involves the use of a 3D CAD model, whereby a computer CAD file may be created and stored in a controller 60. During operation, the 3D insulating structure 15 may be modeled as a plurality of individual layers. The laser 56 of the machine 52 is in operative communication with the controller 60. As such, the controller 60 provides signals S6 to the laser 56 to scan the selected areas of the 3D insulating structure. The machine 52 may also include a material dispensing platform and a build platform along with a recoater blade used to move new hollow microspheres 40 over the build platform 64. The technology fuses the hollow microspheres 40 together, into a porous, solid part, by melting it locally using the focused laser beam 58. Parts of the 3D insulating structure 15 are built up additively layer by layer 40A1, 40A2, as illustrated in FIG. 7. DMLS is a net-shape process, producing parts with high accuracy and detail resolution, good surface quality and excellent mechanical properties.

Referring again to FIG. 8, the method begins at step 102, where a base 62 is positioned on a tool platform 64 of the additive manufacturing device 52. The base 62 may be the bonding layer 20, the transition layer 22B, a sacrificial material, and the like.

The method proceeds to step 104, where a first layer 40A1 of hollow microspheres 40 is deposited onto the base 62. As described above, the hollow microspheres 40 have a metallic coating 44 formed thereon.

The method then proceeds to step 106, where a laser beam 58 is scanned over the hollow microspheres 40 so as to sinter the metallic coating 44 of the hollow microspheres 40 at predetermined locations.

Next, the method proceeds to step 108, where at least one layer 40A2 of the hollow microspheres 40 is deposited onto the first layer 40A1 of microspheres 40. The method returns to repeat step 106 until the desired 3D insulating structure 15 is achieved.

Once the desired 3D insulating structure 15 is achieved, the method may optionally proceed to step 110, where the 3D insulating structure 15 is inserted into the oven 54. The oven 54 is preferably preheated to a temperature that is less than the solidus of the copper and nickel. This optional step 110 may be used when the hollow microspheres include the inner and outer metallic coating layers 44A, 44B shown in FIGS. 4-6 and previously described herein. While adjacent outer metallic coating layers 44B may become sintered to one another as a result of application of the laser beam 58 in step 108, the laser beam 58 would not cause the desired diffusion and alloying to occur between the metallic materials of the inner and outer metallic coating layers 44A, 44B. As such, oven 54 may be utilized to achieve the intended result.

Next, the method proceeds to step 112, where the 3D insulating structure 15 is soaked in the oven 54 at the preheated temperature (T), for at least a desired soak time (t), such that the desired level of diffusion has occurred, i.e., when the Ni of the inner metallic coating layer 44A is diffused with the Cu of the outer metallic coating layer 44B. Additionally, the 3D structure 15 may be soaked at an inert atmospheric pressure, such that a pressure within each of the hollow microspheres 40 is equalized with atmospheric pressure during the soak. The use of such a pressurized system may compensate for expansion of the hollow microspheres 40, caused by gas pressure inside.

Additionally, it should be appreciated that one or more of the other layers 20, 24 of the TBC 14 may be applied to the insulating layer 22 during operation of the additive manufacturing device 52, and sintered to the insulating layer 22 via operation of the laser 56. The materials used to produce the sealing layer 24 and/or the bonding layer 20 may be individually fed to the additive machine 52, via individual feeders. The material may be as a powder or as a formed sheet that moves into the additive machine 52. The material applied to form the sealing layer 24 may be melted to form an impervious sealing layer for the insulating layer 22 there below.

Alternatively, one or more of the other layers 20, 24 may be applied to the insulating layer 22 by physical or chemical vapor deposition, electroplating, and the like.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. A method of manufacturing an insulating three-dimensional (3D) structure from a plurality of hollow microspheres, each having a metallic coating formed thereon, the method comprising:

depositing a first layer of a plurality of hollow microspheres onto a base;

scanning a laser beam over the plurality of hollow microspheres of the first layer so as to sinter the metallic coating of the hollow microspheres of the first layer together at predetermined locations;

depositing a successive layer of another plurality of hollow microspheres onto the first layer, with the first layer disposed between the successive layer and the base such that the successive layer is spaced from the base;

scanning the laser beam over the plurality of hollow microspheres for the successive layer so as to sinter the metallic coating of the hollow microspheres together at predetermined locations to construct the 3D structure; and wherein the 3D structure includes a sealing layer and an insulating layer disposed between the sealing layer and the first layer such that the sealing layer is spaced from the base, and with the insulating layer being porous and the sealing layer being non-permeable to combustion gasses such that the sealing layer seals against the insulating layer.

2. The method, as set forth in claim 1, wherein the insulating layer has a porosity of at least 80%.

3. The method, as set forth in claim 2, wherein the insulating layer has a porosity of at least 95%.

4. The method, as set forth in claim 1, wherein the insulating layer has a thickness of between 100 microns and 1 millimeter.

5. The method, as set forth in claim 4, wherein the sealing layer has a thickness of between 100 and 500 microns.

6. The method, as set forth in claim 5, wherein the sealing layer has a thickness of between 100 and 300 microns.

7. The method, as set forth in claim 1, wherein the insulating layer and the sealing layer are configured to withstand pressures as high as 150 bar and configured to withstand a surface temperature as high as 1,100 degrees Celsius.

8. The method, as set forth in claim 1, wherein each of the base, the insulating layer, and the sealing layer is configured to withstand thermal fatigue.

9. The method, as set forth in claim 1, wherein each of the plurality of hollow microspheres has a diameter of not greater than 100 μm.

10. The method, as set forth in claim 9, wherein each of the plurality of hollow microspheres has a diameter of between 20 and 100 μm.

11. The method, as set forth in claim 10, wherein each of the plurality of hollow microspheres has a diameter of between 20 and 40 μm.

12. The method, as set forth in claim 1, wherein the metallic coating of each of the plurality of hollow microspheres comprises at least one of nickel, iron, and alloys of nickel and iron.

13. The method, as set forth in claim 1, wherein the metallic coating of each of the plurality of hollow microspheres includes a first metallic coating layer and a second metallic coating layer, disposed on the first metallic coating layer;

wherein the first metallic coating layer comprises nickel and the second metallic coating layer comprises copper; and wherein scanning the laser beam over the plurality of hollow microspheres is further defined as scanning the laser beam over the plurality of hollow microspheres so as to sinter the second metallic coating layer of the plurality of hollow microspheres together at predetermined locations.

14. The method, as set forth in claim 13, further comprising:

placing the 3D structure in a furnace at a temperature less than a solidus of copper and nickel; and soaking the 3D structure in the furnace at the temperature, for at least a soak time, such that diffusion between the first metallic coating layer and the second metallic coating layer occurs and the nickel of the first metallic coating layer is diffused with the copper of the second metallic coating layer.

15. The method, as set forth in claim 14, wherein the 3D structure is soaked at an inert atmosphere such that a pressure within each of the plurality of hollow microspheres is equalized with atmospheric pressure.

16. The method, as set forth in claim 1, wherein the base comprises at least one of a copper based material, a zinc based material, and an alloy comprising copper and zinc; and wherein scanning the laser beam over the plurality of hollow microspheres of the first layer is further defined as scanning the laser beam over the plurality of hollow microspheres of the first layer so as to sinter the metallic coating of the hollow microspheres of the first layer together at predetermined locations and to sinter the metallic coating of the hollow microspheres to the base at predetermined locations.

17. A method of manufacturing an insulating three-dimensional (3D) structure comprising:

positioning a base on an additive manufacturing device;

forming the 3D structure over the base by an additive manufacturing process;

wherein the additive manufacturing process comprises forming an insulating layer having layer upon layer of a plurality of hollow microspheres being formed one layer at a time, such that one layer is disposed directly on the base, another layer is disposed on the previous layer in which the another layer is spaced from the base, wherein each one of the plurality of hollow microspheres has a metallic coating formed thereon; and wherein the 3D structure includes a sealing layer, and wherein the insulating layer is disposed between the sealing layer and the base such that the sealing layer is spaced from the base, and with the insulating layer being porous and the sealing layer being non-permeable to combustion gasses such that the sealing layer seals against the insulating layer.

18. The method of claim 17, wherein the additive manufacturing process comprises at least one of direct metal laser sintering (MILS), selective laser sintering (SLS), and selective laser melting (SLM).

19. The method of claim 17, wherein the metallic coating of the plurality of hollow microspheres comprises at least one of nickel, iron, and alloys of nickel and iron.

* * * * *